(12) United States Patent
Chambert

(10) Patent No.: US 6,447,169 B2
(45) Date of Patent: Sep. 10, 2002

(54) BALL CAGE

(75) Inventor: Olivier Chambert, Cran-Gevrier (FR)

(73) Assignee: SNR Roulements, Annecy (FR)

( * ) Notice: Subject to any disclaimer, the term of this patent is extended or adjusted under 35 U.S.C. 154(b) by 0 days.

(21) Appl. No.: 09/802,855

(22) Filed: Mar. 12, 2001

(30) Foreign Application Priority Data

Mar. 10, 2000 (FR) .......................................... 00 03074

(51) Int. Cl.$^7$ .............................................. F16C 33/38
(52) U.S. Cl. ...................................... 384/523; 384/526
(58) Field of Search ................................ 384/523, 526, 384/528

(56) References Cited

U.S. PATENT DOCUMENTS

| 851,697 A | * | 4/1907 | Schneider ................... 384/526 |
| 1,303,712 A | * | 5/1919 | Newmann ................... 384/528 |
| 2,883,244 A | * | 4/1959 | Berger ......................... 384/49 |
| 3,586,405 A | * | 6/1971 | Claesson .................... 384/526 |
| 3,975,066 A | | 8/1976 | Hofmann et al. |
| 4,451,098 A | * | 5/1984 | Farley et al. ................ 384/526 |
| 4,560,291 A | | 12/1985 | Bonengel et al. |
| 4,626,113 A | * | 12/1986 | Forknall et al. ............. 384/526 |
| 4,723,851 A | * | 2/1988 | Troster et al. .............. 384/504 |
| 4,741,632 A | | 5/1988 | Jacobson |
| 4,804,276 A | | 2/1989 | Olschewski et al. |
| 5,082,375 A | * | 1/1992 | Hillmann .................... 384/526 |
| 5,409,359 A | * | 4/1995 | Takano et al. .............. 384/516 |

FOREIGN PATENT DOCUMENTS

| DE | 196 34 483 | | 4/1997 | |
| FR | 2665231 | * | 1/1992 | ................. 384/523 |
| GB | 966128 | | 8/1964 | |

* cited by examiner

Primary Examiner—Christopher P. Schwartz
Assistant Examiner—Devon Kramer
(74) Attorney, Agent, or Firm—Oblon, Spivak, McClelland, Maier & Neustadt, P.C.

(57) ABSTRACT

A cage for a ball bearing, having a front face with cells adapted to hold a row of balls, and a rear face including a ring-shaped body with slots. The slots are adapted to interlock with slots of a second cage. The slots have teeth that extend towards the front face and separate the cells, and the teeth have sides with semispherical bearing surfaces oriented towards a center of a respective cell. The front face includes a closing ring linking the teeth, were the closing ring is adapted to be recessed in relation to an axial extremity of the balls. Additionally, a bearing is provided that includes an outer bushing, an inner bushing, a row of balls, and a cage configured to receive the row of balls, where the cage and the row of balls are received between the outer and inner bushings.

20 Claims, 2 Drawing Sheets

BALL CAGE

CROSS REFERENCE TO RELATED APPLICATIONS

The present invention claims priority to French Application No. 00-03074, filed on Mar. 10, 2000 which is hereby incorporated by reference in its entirety.

BACKGROUND OF THE INVENTION

1. Field of the Invention

The present invention relates generally to a ball cage and a bearing for the ball cage.

2. Discussion of the Background

Publication FR 2 665 231 describes a two-part cage, where each part includes a front face equipped with open cells, and a rear face. The cells hold a row of balls and the rear face includes means for angularly offsetting one part in relation to the other in order to reduce the distance between centers of the balls. This type of cage offers the advantage of reduced weight and bulk.

However, in practice, this type of cage with open cells must have sufficient rigidity to allow automatic fitting of the balls into the cells without causing excessive deformation of the cage body. Moreover, in order to ensure that the balls are held while fitting the cage with the balls into the bearing, it is necessary to provide proper rigidity of the cage and the cells. Proper rigidity of the cage and the cells is also necessary when the bearing is operating under stress. The rigidity of the cage and the cells is directly linked to the thickness of the cage body and the cell separation teeth. A further competing factor in constructing the bearing is the fact that the number of balls per row for a given bulk directly affects bearing performances, especially the bearing's ability to bear heavy loads (generally speaking the larger the number of balls per row in the bearing, the greater heavy load bearing ability of the bearing). However, the bearing is generally constructed to fit within a limited area, and therefore by increasing the number of balls per row, the thickness of the cage body and cell separation teeth must be decreased.

Therefore, the inventors have determined that what is needed is a ball cage that minimizes the thickness of the cage body and teeth, yet provides the necessary rigidity to properly accommodate the balls.

SUMMARY OF THE INVENTION

Accordingly, the present invention advantageously provides a cage whose shapes are optimized to receive a maximum number of balls while retaining sufficient rigidity to ensure that the balls are held during the fitting or operating phases under bearing stress, and which is simple, lightweight and easy to manufacture.

To this end, the invention relates to a ball cage having a front face with cells for holding a row of balls and a rear face including a ring-shaped body with slots ensuring proper positioning in relation to another cage of the same type, which is interlocked to the cage. The slots each have a bottom extending in the direction of the front face as cell separation teeth. The teeth have sides that possess semispherical bearing surfaces oriented towards a center of an adjacent cell.

According to the invention, the cage preferably has a front face that includes a closing ring linking the peripheral extremities of the teeth.

According to a preferred characteristic of the invention, the teeth are locally of highly reduced thickness at the radial height of the center of the balls.

According to another preferred characteristic of the invention, the teeth extend obliquely from the ring-shaped body of the rear face and are at a radial height which is lower than the radial height of the center of the balls, up to the ring of the front face, which is at a radial height which is higher than the radial height of the center of the balls.

According to another preferred characteristic of the invention, the teeth extend approximately 45° in relation to a cage axis.

According to another preferred characteristic of the invention, the ring includes, at a periphery of the balls, an inner face equipped with semispherical bearing surfaces oriented toward the center of the adjacent cells.

According to another preferred characteristic of the invention, the ring is axially recessed in relation to the axial extremity of the balls.

According to another preferred characteristic of the invention, the ring includes an inner radial edge which presents a circular cutout opposite each ball. The cutout corresponds to the intersection of the semispherical bearing surface of the cells with the plane of the front face, and allows the balls to overflow or extend beyond the front face.

According to another preferred characteristic of the invention, the inner edge of the ring-shaped body of the rear face includes holding clips.

The present invention also advantageously concerns a bearing for a row of balls, which includes a cage with the characteristics described above.

The invention also advantageously concerns a bearing for two rows of balls, which includes two cages with the characteristics described above, where the slots of the cages are interlocking.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

The present invention will now be described with reference to preferred embodiments that provide advantageous structures that addresses the concerns identified by the inventors, which are described above.

The invention relates to a ball cage, specifically to a ball cage including supplementary assembly means with another cage of the same type and openings for introducing and holding balls.

Figure 1:
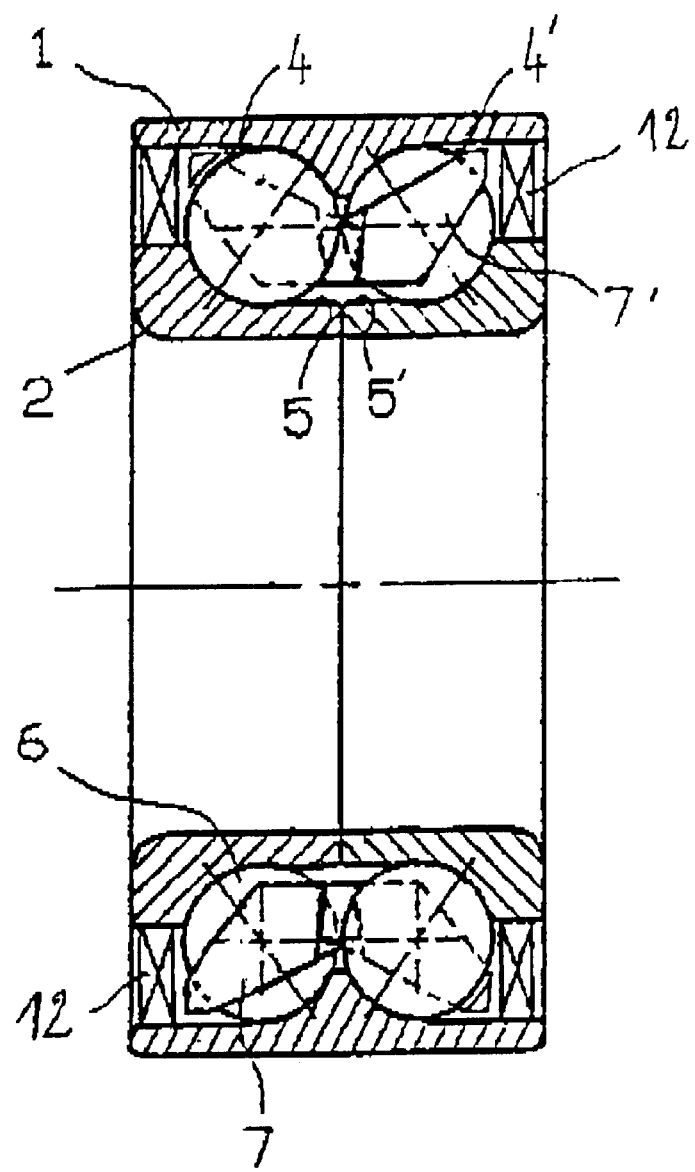
FIG. 1 is a partial cross-sectional view of a bearing having two rows of oblique contact balls contained in two interlocking cages in accordance with the present invention.

FIG. 1 depicts an embodiment of a bearing that includes an outer bushing 1 and an inner bushing 2 in two parts. Bushings 1 and 2 possess inner bearing paths 4, 4' and outer bearing paths 5, 5' for receiving and providing a rolling track for oblique contact bodies 6, which are grouped into two rows of balls. The balls 6 are contained in two identical cages 7, 7' in accordance with the invention, one of which is shown in greater detail in FIG. 2.

The cage 7 possesses a rear face including a ring-shaped body 10 equipped with angled slots 10a that are intended to mesh into the angled slots of the other cage 7' in order to create an angled offset of the two cages 7 and 7' when the angled slots of the cages 7 and 7' are interlocked, as depicted in FIG. 1. Advantageously, the inner face of the ring-shaped body 10 includes holding clips 13 intended to ensure axial holding of the two cages 7 and 7' of the inner bushing 2 and hence to create a bearing whose integral elements are easier to maintain.

The ring-shaped body 10 extends in the direction of the front face by separation segments formed as teeth 11. The teeth 11 originate at the bottom of each slot 10a and extend obliquely along an approximately 45° angle in relation to the cage axis. Each lateral side of the teeth 11 possesses a semispherical bearing surface, which works together with the semispherical bearing surface of the neighboring teeth 11 to form cells 9 to hold the balls 6. The term "semispherical" is used herein to describe a shape that is generally spherical, but a shape which may not define an entire sphere.

The teeth 11 present a flared end following the contour of the semispherical bearing surface and are linked together at the front face by a closing ring 8 which closes the cells 9 at the periphery of the balls 6 at a radial height which is slightly higher than the radial height of the center of the balls 6.

Figure 2:
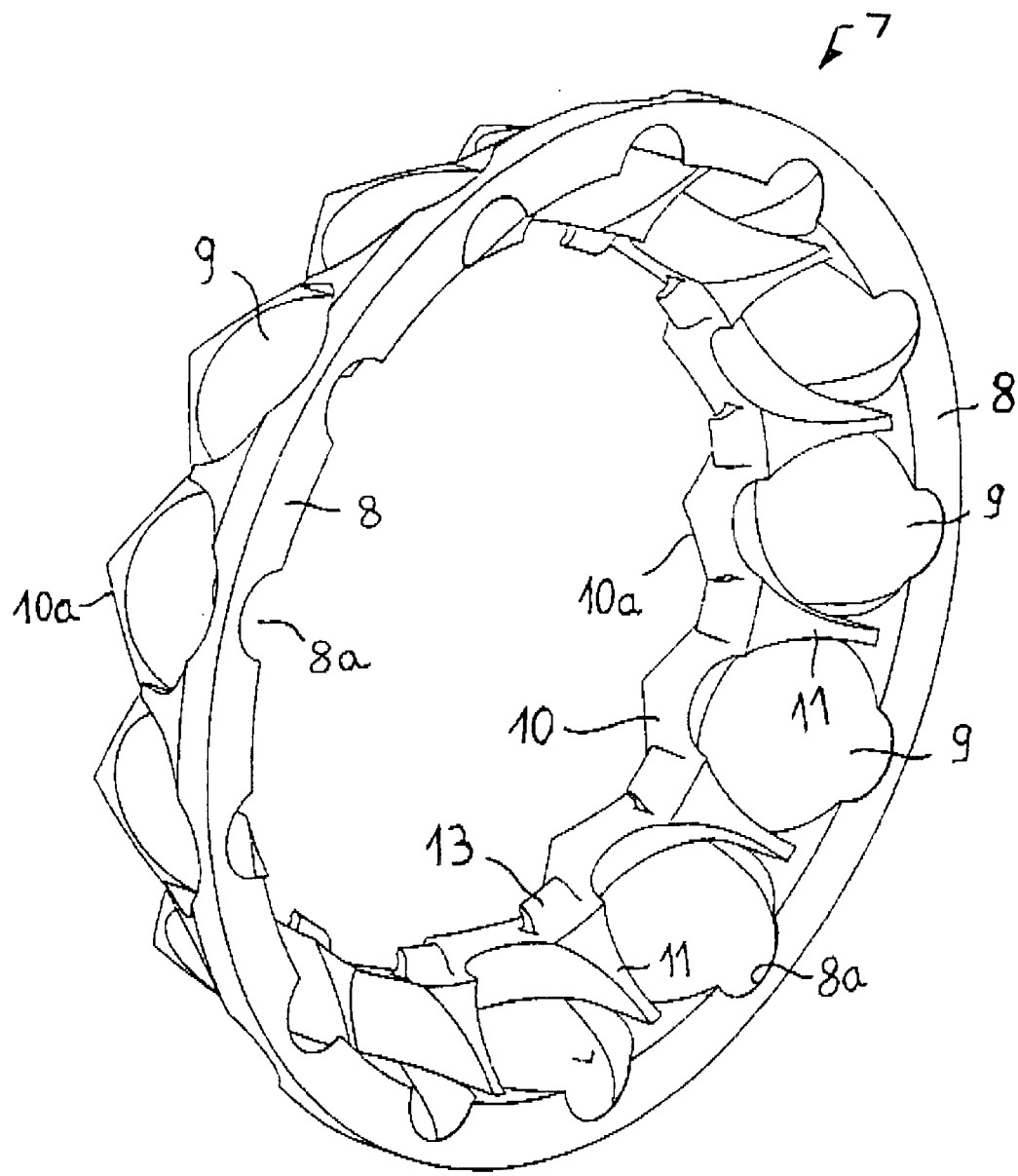
FIG. 2 is an enlarged perspective view of a ball cage in accordance with the present invention.

In conformity with FIG. 2, the teeth 11 are locally thinned in order to create a very thin separation wall at the radial height of the center of the balls 6, with the lateral rigidity of the teeth 11 being ensured by the peripheral attachment of the teeth 11 to the ring 8. The inner wall of the ring 8 includes, opposite each ball 6, a semispherical bearing surface oriented toward the center of the cell 9 ensuring the extension of the semispherical bearing surfaces of the teeth 11, and the intersection of the bearing surface with the front face is materialized by a circular cutout 8a which allows the surface of the ball 6 to overflow, or extend beyond, the front face.

The fitting of the balls 6 into the cells 9 is carried out laterally by the outer radial face of the cage 7 by elastic deformation of the cells 9. Once the balls 6 are fitted, then the cages 7 and 7' are fitted on the inner bushings, and assembled back-to-back in order to form two rows of partially interlocked balls in the assembled bearing. In another embodiment of a ball cage according to the present invention, where the width of the distance between centers of the balls 6 is less constraining, the balls need not be interlocked.

Since the closing ring 8 is recessed in relation to the axial extension of the balls 6, the axial bulk of the cage 7 is not increased by the presence of the ring 8, and hence the present invention allows the use of standard sealing devices 12, as depicted in FIG. 1.

The cage of the present invention allows for a reduction in the thickness of the separation teeth of the balls, and therefore allows for an increase in the number of balls held by a cage with a given diameter. Furthermore, the cage of the present invention allows for an increase in bearing performance, especially the maximum load that the bearing can support for a given bulk. The cage in accordance with the invention also allows for a decrease in the weight and bulk of the bearing devices capable of bearing a given load.

The cage in accordance with the present invention can alternatively be mounted alone in a one-row bearing.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed is:

1. A cage for a ball bearing, the cage having a front face with cells for holding a row of balls and a rear face including a ring-shaped body with slots which ensure positioning relative to a second cage of a same type interlocked with the cage, each slot having a bottom extending in a direction of the front face by teeth for separating the cells whose sides possess semispherical bearing surfaces oriented towards a center of an adjacent cell, wherein the front face includes a closing ring linking peripheral extremities of the teeth, the closing ring being axially recessed in relation to an axial extremity of the balls.

2. The cage in accordance with claim 1, wherein the teeth are locally of reduced thickness at a radial height of a center of the balls relative to a remainder of the teeth.

3. The cage in accordance with claim 1, wherein the teeth extend obliquely from the ring-shaped body of the rear face, which is set at a radial height which is lower than a radial height of a center of the balls, up to the closing ring of the front face, set at a radial height which is higher than the radial height of the center of the balls.

4. The cage in accordance with claim 3, wherein the teeth extend out approximately 45° in relation to an axis of the cage.

5. The cage in accordance with claim 1, wherein the closing ring includes, on a periphery of the balls, an inner face equipped with semispherical bearing surfaces oriented toward the center of the adjacent cell.

6. The cage in accordance with claim 1, wherein the closing ring includes an inner radial edge presenting a circular cutout opposite each ball corresponding to an intersection of the semispherical bearing surface of the cell with a plane of the front face, the cutout allowing the balls to overflow beyond the front face.

7. The cage in accordance with claim 1, wherein an inner edge of the ring-shaped body of the rear face includes holding clips.

8. A bearing including a cage according to claim 1.

9. A bearing include first and second cages in accordance with claim 1, wherein the slots of the first and second cages are interlocked.

10. A cage for a ball bearing, said cage comprising:

a front face with cells adapted to hold a row of balls; and a rear face including a ring-shaped body with slots which are adapted to interlock with slots of a second cage, the slots have teeth that extend towards the front face and separate the cells, the teeth have sides with semispherical bearing surfaces oriented towards a center of a respective cell, wherein the front face includes a closing ring linking the teeth, the closing ring being adapted to be recessed in relation to an axial extremity of the balls.

11. The cage in accordance with claim 10, wherein the teeth are adapted to be locally of reduced thickness at a radial height of a center of the balls relative to a remainder of the teeth.

12. The cage in accordance with claim 10, wherein:

the teeth extend obliquely from the ring-shaped body of the rear face up to the closing ring of the front face;

the ring-shaped body being set at a radial height which is lower than a radial height of a center of the balls; and the closing ring being set at a radial height which is higher than the radial height of the center of the balls.

13. The cage in accordance with claim 11, wherein:

the teeth extend obliquely from the ring-shaped body of the rear face up to the closing ring of the front face;

the ring-shaped body being set at a radial height which is lower than the radial height of the center of the balls; and the closing ring being set at a radial height which is higher than the radial height of the center of the balls.

14. The cage in accordance with claim 12, wherein the teeth extend out approximately 45° in relation to an axis of the cage.

15. The cage in accordance with claim 13, wherein the teeth extend out approximately 45° in relation to an axis of the cage.

16. The cage in accordance with claim 10, wherein the closing ring includes an inner face having semispherical bearing surfaces oriented toward the center of the respective cell.

17. The cage in accordance with claim 10, wherein the closing ring includes an inner radial edge having a circular cutout adapted to be opposite a respective ball, the circular cutout corresponding to an intersection of the semispherical bearing surfaces with a plane of the front face, the circular cutout being adapted to allow the balls to extend beyond the front face.

18. The cage in accordance with claim 10, wherein the ring-shaped body includes an inner edge that has holding clips.

19. A bearing comprising:

an outer bushing having a first bearing path;

an inner bushing having a second bearing path;

a first row of balls; and a first cage configured to receive the first row of balls, the first cage and the first row of balls being received between the first bearing path and the second bearing path, the first cage including:

a front face with cells configured to hold the row of balls; and a rear face including a ring-shaped body, the ring-shaped body includes teeth that extend towards the front face and separate the cells, the teeth have sides with semispherical bearing surfaces oriented towards a center of a respective cell, wherein the front face includes a closing ring linking the teeth, the closing ring being recessed in relation to an axial extremity of balls of the first row of balls.

20. The bearing in accordance with claim 19, further comprising:

a second row of balls; and a second cage configured to receive the second row of balls, the second cage and the second row of balls being received between the first bearing path and the second bearing path, the second cage including:

a front face with cells configured to hold the second row of balls; and a rear face including a ring-shaped body with slots which interlock with slots on the ring-shaped body of the first cage, the slots of the second cage include teeth that extend towards the front face and separate the cells, the teeth have sides with semispherical bearing surfaces oriented towards a center of a respective cell, wherein the front face includes a closing ring linking the teeth, the closing ring being recessed in relation to an axial extremity of balls of the second row of balls.

* * * * *